UNITED STATES PATENT OFFICE.

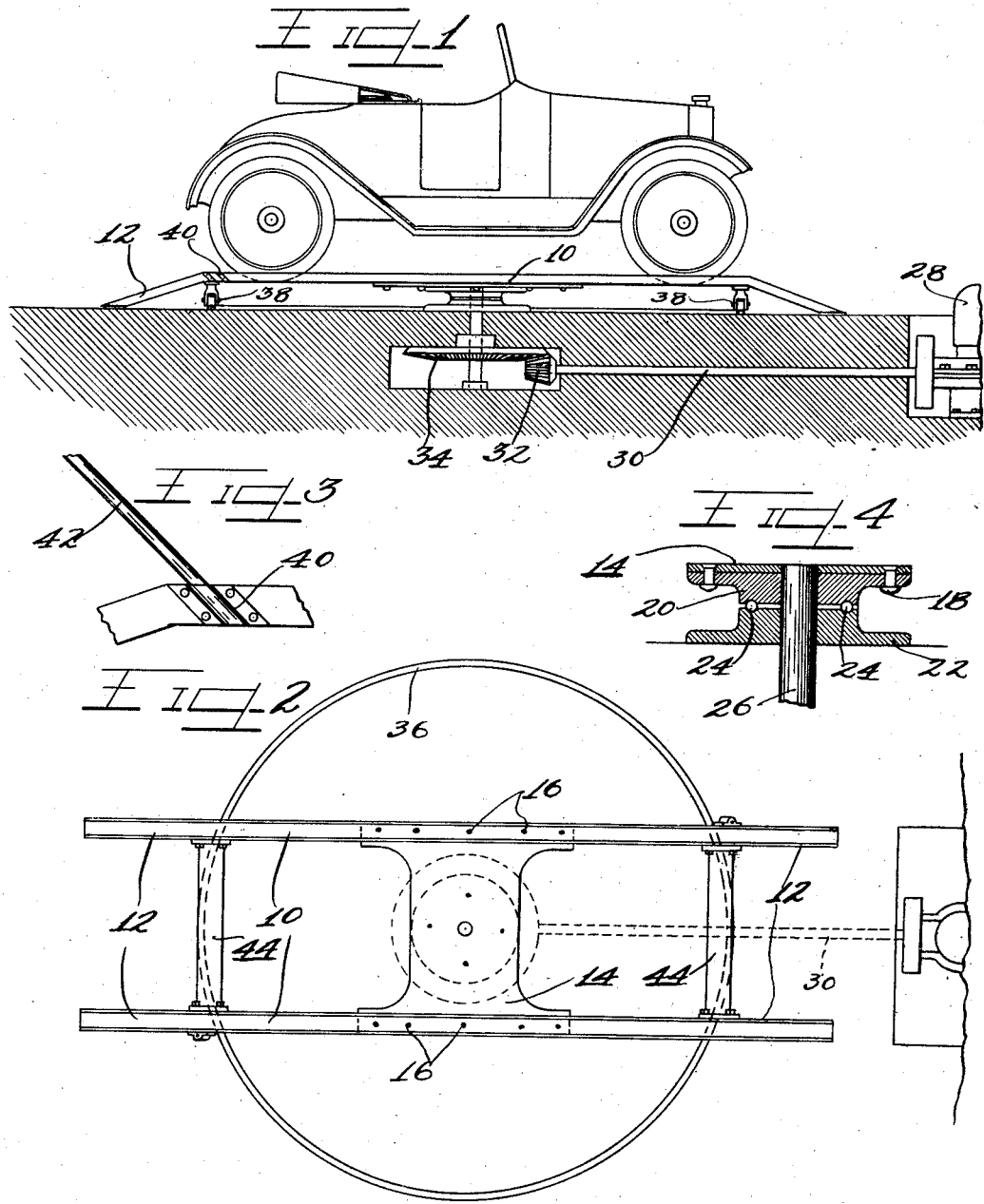

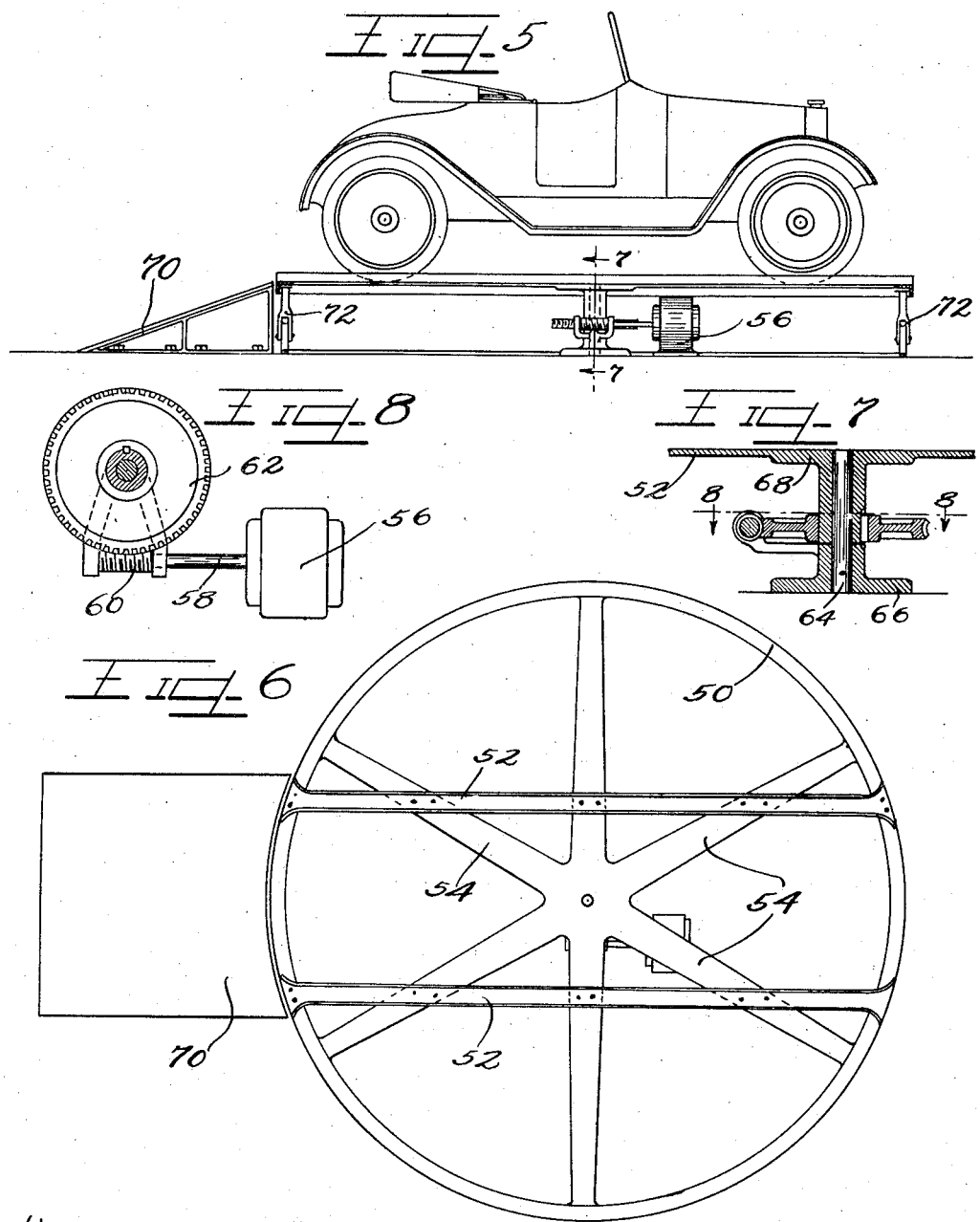

GEORGE C. POTTS, OF CHICAGO, ILLINOIS.

AUTOMOBILE-TURNTABLE.

1,378,898.　　　　　Specification of Letters Patent.　　Patented May 24, 1921.

Application filed February 10, 1921. Serial No. 443,786.

*To all whom it may concern:*

Be it known that I, GEORGE C. POTTS, a citizen of the United States, and a resident of the city of Chicago, in the county of Cook and State of Illinois, have invented certain new and useful Improvements in Automobile-Turntables; and I do hereby declare that the following is a full, clear, and exact description of the same, reference being had to the accompanying drawings, and to the numerals of reference marked thereon, which form a part of this specification.

This invention relates to improvements in turn tables especially for use with automobiles in garages or crowded repair shops and has for one of its objects the production of a device which can be economically used in a garage or an automobile repair shop and which will enable the automobiles to be turned and distributed over the floor space of the garage with a minimum of trouble and in the shortest possible time, and without the necessity of moving other cars.

Another object of this invention is the provision of a turn table for automobiles in the shape of a pair of revoluble tracks upon which an automobile is adapted to be run and which can be positioned in a garage or repair shop without taking up any extra floor space and from which an automobile or the like can be subsequently driven off in any desired direction.

Another important object of this invention is the provision of a turn table for automobiles or the like which will also act as a pit such as are commonly used in repair shops, so that access to the under portion of a machine may be readily had and which device may be readily kept clean and free from grease or other waste material the accumulation of which constitutes one of the main disadvantages of pits as now used in automobile repair shops.

Still another object of this invention is the provision of a turn table for automobiles or the like which can be either manually operated or turned by a gas or an electric motor controlled by switch, rheostat or throttle, or in any convenient manner and to any desired degree.

Other and further important objects of this invention will be apparent from the disclosures in the accompanying drawings and specification.

The invention (in a preferred form) is illustrated in the drawings and hereinafter more fully described.

On the drawings:

Figure 1 is a side elevation of an automobile shown in position upon the improved turn table of this invention, parts being in section.

Fig. 2 is a top plan view of this turntable.

Fig. 3 is a detail view showing the method of applying a handle for a manual operation of the turntable.

Fig. 4 is a sectional view showing the pin and bearings upon which the turntable is adapted to rotate.

Fig. 5 is an elevation showing a slight modification.

Fig. 6 is a plan view of this modified form of invention.

Fig. 7 is a sectional view taken on the line 7—7 of Fig. 5.

Fig. 8 is a partial sectional view taken approximately on the line 8—8 of Fig. 7.

As shown on the drawings:

The reference numerals 10 indicate a pair of rotatably supported tracks of channel form made of iron, steel, wood or the like upon which an automobile is adapted to be run, the same being slightly elevated above the floor and having their ends bent downwardly so as to provide inclined planes for the convenient driving of a machine on and off of same. The inclined ends 12 are integral with or attached to the main channel bars 10 and rotate therewith. A cross piece 14 made preferably of a metal plate or the like connects the two channel bars or tracks 10 spacing them the required distance apart so as to properly support an ordinary automobile and the plate 14 is attached to the tracks 10 by means of rivets 16 or the like. The plate 14 is fixed by means of rivets 18 to a trunnion or bearing member 20 supported by means of ball bearings 24 to a plate 22 positioned upon the floor of a garage, or if desired the whole device may be sunk into the floor and maintained flush therewith. A post 26 is rotatably mounted in the plate or bearing 22 and said post with the plate 14 attached thereto is adapted to be turned or driven by a motor 28 which operates thereon through a drive shaft 30 and a system of beveled gears 32 and 34 in an obvious manner. This driving apparatus and its motor are preferably positioned under the floor of the shop as shown.

A circular track 36 laid on the floor is preferably provided for a series of rollers or wheels 38 which are mounted under the channel bars at the end of the horizontal portion thereof and at their junction with the inclined portions 12. These rollers 38 coöperate with the track 36 and continuously ride upon the same thereby supporting the track members 10 and 12 from any distortion or bending due to the weight of the automobile thereon. A slot 40 is positioned at any convenient portion of the track 10 and is adapted for the insertion therein of a handle 42 by means of which the device may be manually turned if desired. Cross braces 44 are preferably positioned at the ends of the channel members 10 so as to hold the same in correct relation to each other.

In the modification shown in Figs. 5 to 8 inclusive the device includes a similar turn table which is practically in the shape of a wheel 50 having channel or track members 52 positioned thereon and provided with a plurality of spokes 54. A motor 56 is provided for turning the device and this device is elevated to a sufficient height above the floor of the garage so that the motor may be positioned immediately underneath the table, which additional elevation will likewise provide a space for a mechanic or repairman to have convenient access to the under side of a car placed upon the turn table, or, if desired, the whole wheel 50, with its attached tracks 52, may be positioned flush with the level of the floor and the motor 56 with its turning gears may be located in a pit underneath the turn table if desired, said pit being of sufficient size to accommodate a workman. A shaft 58 extends from the motor and is provided with a worm gear 60 which coöperates with a circular driving gear 62, by means of which the turn table 50 is operated as will be obvious. A pin 64 is preferably mounted upon a fixed supporting plate 66, about which the turn table may rotate. The gear wheel 62 and the supporting member 68 for the turn table are preferably made integral or attached to each other and rotatable upon the pin 64. An inclined runway 70 is provided in case the device is elevated above the floor of the shop or garage, and a series of wheels 72 are located around the periphery of the wheel 50 so as to support the apparatus, one of these wheels being preferably located at the end of each spoke 54 and a circular track may be provided to coact with the same if desired.

It will be seen that herein is provided a turn table for automobiles or the like which may be positioned in garages or repair shops and which will take up practically no extra floor space and which will be adapted for the running thereon and off of an automobile from and in any direction and which may also be used for a means for repairing those parts of a car, which, being located on the under side thereof, are ordinarily difficult of access as this apparatus acts in the manner of a pit such as is ordinarily used. In the case of the track 36 described with the first modification, if the floor is sufficiently smooth, this may be eliminated and the rollers 38 allowed to run on the floor, or, if desired, the whole device may be made flush with the floor and the tracks positioned in the pit underneath.

The gear drive of either modification may, if desired, be changed to a chain or belt drive in any obvious manner, and I am aware that numerous details of construction may be varied through a wide range without departing from the principles of this invention, and I therefore do not purpose limiting the patent granted otherwise than necessitated by the prior art.

I claim as my invention:

1. In a device of the class described, the combination of a pair of channel shaped tracks, each track having its ends downwardly inclined and its middle horizontal portion elevated, said tracks being connected together and rotatably mounted by means of a connecting plate, a bearing member for supporting the plate including a pin projecting therefrom, a plate fixed to said pin and having a circular groove therein adapted for the insertion of ball bearings and with which a similar circular plate coöperates, the latter plate being rotatably mounted on said pin, a series of gears connected to the pin, and a driving means for the gears.

2. In a device of the class described, the combination of a pair of channel shaped tracks, each track having its ends downwardly inclined and its middle horizontal portion elevated, said tracks being connected together and rotatably mounted by means of a connecting plate, a bearing member for supporting the plate including a pin projecting therefrom, a plate fixed to said pin and having a circular groove therein adapted for the insertion of ball bearings and with which a similar circular plate coöperates, the latter plate being rotatably mounted on said pin, a series of gears connected to the pin, and a driving means for the gears, the device being supported in its elevated position by a series of rollers and a circular track for the rollers, a roller being mounted at each end of the horizontal portion of each of the channeled track members.

3. In a device of the class described, the combination of a pair of channel shaped tracks, each track having its ends downwardly inclined and its middle horizontal portion elevated, said tracks being connected together and rotatably mounted by means of a connecting plate, a bearing member for supporting the plate including a pin projecting therefrom, a plate fixed to said pin and having a circular groove therein adapted for the insertion of ball bearings and with which a similar circular plate coöperates, the latter plate being rotatably mounted on said pin, a series of gears connected to the pin, a driving means for the gears, the device being supported in its elevated position by a series of rollers and a circular track for the rollers, a roller being mounted at each end of the horizontal portion of each of the channeled track members, and auxiliary manually controlled means for operating the turntable.

4. In an automobile turn table, a circular track, a foundation supporting said track, a vertical shaft mounted in said foundation at the center of said track, a pair of channel shaped automobile supporting members crossing said track, a connecting plate for said members at the middle thereof, cross braces connecting said members near the ends thereof, wheels running on said track, trucks supported by said wheels and supporting said channel shaped members near their junctions with the cross braces, a thrust collar supporting said connecting plate and so supporting the central part of said channel shaped members, said thrust collar including a part secured to said shaft and to said connecting plate, a part loosely surrounding said shaft and mounted on said foundation and ball bearings between said parts, a chamber in said foundation surrounding said shaft, a gear connected to said shaft and housed in said chamber, a motor located outside the circle of said track, a shaft running through said foundation from said motor to said chamber, and driving connections between said shaft and said gear.

5. In an automobile turn table, a circular track, a foundation supporting said track, a vertical shaft mounted in said foundation and extending above the top thereof at the center of said track, a pair of channel shaped automobile supporting members crossing said track above the level of the top of said foundation, a connecting plate for said members at the middle thereof, cross braces connecting said members near the ends thereof, wheels running on said track, trucks supported by said wheels and supporting said channel shaped members near their junctions with the cross braces, ramps extending from said channel shaped members to the level of the top of said foundation, a thrust collar supporting said connecting plate and so supporting the central part of said channel shaped members, said thrust collar including a part secured to said shaft and to said connecting plate, a part loosely surrounding said shaft and mounted on said foundation and ball bearings between said parts, a chamber in said foundation surrounding said shaft, a gear connected to said shaft and housed in said chamber, a motor located outside the circle of said track, a shaft running through said foundation from said motor to said chamber, and driving connections between said shaft and said gear.

6. In an automobile turn table, a circular track, a foundation supporting said track, a vertical shaft mounted in said foundation and extending above the top thereof at the center of said track, a pair of channel shaped automobile supporting members crossing said track above the level of the top of said foundation, a connection plate for said members at the middle thereof, cross braces connecting said members near the ends thereof, wheels running on said track, trucks supported by said wheels and supporting said channel shaped members near their junctions with the cross braces, ramps extending from said channel shaped members to the level of the top of said foundation, a thrust collar supporting said connecting plate and so supporting the central part of said channel shaped members, said thrust collar including a part secured to said shaft and to said connecting plate, a part loosely surrounding said shaft and mounted on said foundation and ball bearings between said parts, a chamber in said foundation surrounding said shaft, a gear connected to said shaft and housed in said chamber, a motor located outside the circle of said track, a shaft running through said foundation from said motor to said chamber, and driving connections between said shaft and said gear.

In testimony whereof I have hereunto subscribed my name in the presence of two subscribing witnesses.

GEORGE C. POTTS.

Witnesses:
CARLTON HILL,
JAMES M. O'BRIEN.